United States Patent [19]
Goodman

[11] Patent Number: 4,916,691
[45] Date of Patent: Apr. 10, 1990

[54] TELECOMMUNICATIONS SWITCHING SYSTEM

[75] Inventor: David J. Goodman, Aberdeen Township, Monmouth County, N.J.

[73] Assignees: American Telephone and Telegraph Company, New York, N.Y.; AT&T Bell Laboratories, Murray Hill, N.J.

[21] Appl. No.: 263,928

[22] Filed: Oct. 28, 1988

[51] Int. Cl.[4] ............................................. H04Q 11/04
[52] U.S. Cl. ................................... 370/60; 370/85.12
[58] Field of Search ...................... 370/60, 94, 95, 88; 455/33, 34, 53, 54, 56; 379/59, 60

[56] References Cited

U.S. PATENT DOCUMENTS

| | | | |
|---|---|---|---|
| 4,679,189 | 7/1987 | Olson et al. | 370/60 |
| 4,797,882 | 1/1989 | Maxemchuk | 370/60 |
| 4,811,334 | 3/1989 | Matt | 370/60 |
| 4,823,111 | 4/1989 | Tsuchiya et al. | 370/60 |

OTHER PUBLICATIONS

"Packet Reservation Multiple Access for Local Wireless Communications", Proc. 38th IEEE Vehicular Technology Conference, Phil., Jun. 1988, D. J. Goodman, R. A. Valenzuela, K. T. Gayliard, and B. Ramamurthi, pp. 701–706.

"Cellular Access Digital Network (CADN): Wireless Access to Networks of the Future", IEEE Communications Magazine, vol. 25, No. 6, Jun. 1987, E. S. K. Chien, D. J. Goodman and J. E. Russell, Sr., pp. 22–31.

"Standards for Metropolitan Area Networks", IEEE Communications Magazine, vol. 26, No. 4, Apr. 1988, J. F. Mollenauer, pp. 15–19.

"The QPSX Man", IEEE Communications Magazine, vol. 26, No. 4, Apr. 1988, R. M. Newman, Z. L. Budrikis and J. L. Hullett, pp. 20–28.

"A Narrowband TDMA System for a New Generation Cellular Radio", Proc. 37th IEEE Vehicular Technology Conference, Tampa, Jun. 1987, J. Uddenfeldt and B. Persson, pp. 286–292.

Primary Examiner—Benedict V. Safourek
Assistant Examiner—Wellington Chin
Attorney, Agent, or Firm—Samuel H. Dworetsky

[57] ABSTRACT

A switching system is described in which routing information, which may be associated with packets originating in cellular calls, is divided into information which does not change as the subscriber crosses a cell boundary, and information which does change as the subscriber crosses a cell boundary. Routing procedures associated with the information which does not change as the subscriber crosses a cell boundary are established and stored in the memory of the switch at the beginning of the call. However, routing procedures associated with the information which does change as the subscriber crosses a cell boundary may be derived from the header information of each packet as it arrives at the appropriate portion of the switch.

4 Claims, 11 Drawing Sheets

TELECOMMUNICATIONS SWITCHING SYSTEM

FIELD OF THE INVENTION

This invention involves telecommunications switching systems, and has particularly useful application to cellular radio telecommunications.

BACKGROUND OF THE INVENTION

The commercial introduction of cellular radio telecommunications approximately five years ago is revolutionizing the telecommunications industry. The commercial interest in the cellular technique stems from its ability to enable high volume traffic to operate over the limited number of available radio channels. This is accomplished by dividing large geographical areas into smaller geographical areas, or cells. This permits the reuse of the same radio channels in different cells which are sufficiently separated spatially so as to avoid interference. Consequently, a large geographical area which previously had been limited to, for example, 7000 channels, and consequently, to 700 telephone calls, could now be divided into, for example, 70 cells, each one of which could use a channel set comprising 100 channels, without interference from adjacent cells which are using different 100-channel sets. Consequently, 7,000 telephone calls can now be made from the large geographical area which previously had been limited to 700 telephone calls. This new architecture is effected by introducing appropriate telephone switches which enable the system to maintain the integrity of each telephone call as the source of the telephone call moves from one of the cells to another of the cells. To accomplish this, the system assigns a new frequency to a mobile telephone as it moves from one call to another, and assigns appropriate resources to route the signal from the new cell to the switch itself. Clearly, sophisticated routing and switching equipment, including appropriate software, had to be designed and developed to implement this architecture.

As cellular radio becomes more popular, the cells become saturated due to the presence of more active subscribers within a given cell than there are available frequencies. However, cellular radio has within it an inherent technique for dealing with such an increase in subscribers. This technique is called cell splitting. In implementing cell splitting, the size of the cell is reduced, thereby once again bringing the number of active subscribers within each cell to a number less than or equal to the number of available frequencies. However, the explosive growth of demand for cellular radio makes it apparent that the cell splitting technique will soon become ineffective. This ineffectiveness is not associated with some inherent limitation on the size of the cells, but rather is associated with limitations of the switching machines, which, as the cells become smaller and smaller, have a greater demand placed on them because of the increased frequency with which active subscribers cross cell boundaries. Clearly, every time an active subscriber crosses a cell boundary the switching maching must hand over the call, i.e., assign a new frequency to the mobile terminal and assign resources to connect the signal from the new cell to the switch. Larger switching machines may be able to handle this increased traffic volume. However, they are much more expensive and may not be readily available because of the explosive demand for cellular radio apparatus. This invention is a new cellular radio architecture and infra-structure which permits rapid growth by distributing many of the swtiching and control functions into small modulator units which can be easily added to the system as it grows.

To understand the basic philosophy and operation of the inventive architecture, it is helpful to understand the basic underlying principles of the classic circuit switch, the packet switch, and the virtual circuit packet switch.

The classic circuit switch involves an architecture which dedicates resources, including transmission resources, to each call, for the duration of the call. In circuit switching architecture, as it is applied to cellular radio, when the caller crosses a call boundary the cellular switch must release the resources that had previously been assigned to the given call, and must dedicate new resources to the call, thereby performing many of the functions characteristic of terminating a call and establishing a new call. Essentially all of the comercialized cellular radio architectures are circuit switch architectures, and, because of the heavy burden that such architectures place on the switch, these architectures rapidly saturate the switches as the cells are split time and again to meet increasing demand. Cell splitting increases the burden on the switch because as the cells are split the frequency of boundary crossing increases. (It is understood that the term "call" as used here, and the invention in general, is not limited to transmissions representing audio communications, but rather includes any type of communication including the transmission of data, facsimile, audio, video, etc.)

The pure packet switch architecture in some sense is the direct opposite of the circuit switch architecture, in that the pure packet switch architecture never permanently assigns transmission resources to a given call. Rather, the information being transmitted in the call is divided into packets of information, each one of which is assigned transmission resources based on "header" information associated with each packet, and is routed independently of the other packets of information. Clearly, the advantage of the packet switch architecture is that since transmission resources are not dedicated to any given call, such resources may be used for other calls when the information transmitted by a call is "bursty" rather than steady. The transmission resources can be used for other calls during the idle time periods between the bursts of information. The disadvantage of the packet switch architecture is that it places a heavy burden on the switch, since the switch must establish routing for each packet, unlike the circuit switch architecture which establishes "permanent" routing once for each call. The advantage of packet switching comes at the expense of bandwidth since each packet must contain the necessary "header" information which conveys to the switch the routing requirements of each packet.

In a sense, the advantages of the packet switch architecture and the circuit switch architecture are combined in the virtual circuit packet switch. In the virtual circuit packet switch architecture, the virtual circuit packet switch, like the circuit switch, establishes a route for each call at the beginning of the call. This route is stored in the memory of the switch. Thereafter, each packet contains in its header a call identification number, rather than more complete header information, which enables the switch to find in its memory the correct route for that call. In this manner, the switch does not have to go through the entire routing procedure in order to transmit each packet of a given call, but rather can rely on the previous routing procedure that had been established at the inception of the call. Although virtual circuit packet switching may be applied to cellular radio, switching must still occur as the active subscriber crosses each cell boundary. Consequently, in a very real sense, conventional virtual circuit packet switching offers little relief to the switch from the burdens associated with the increasing frequency of boundary crossings as the cells become smaller.

SUMMARY OF THE INVENTION

This invention is a new switching system and architecture which is particularly effective in addressing the problem of increased switching burden due to the increasing frequency of boundary crossings as cellular radio cells become smaller. An aspect of the invention lies in the realization that routing information, associated with packets originating, for example, in an embodiment of the invention involving cellular calls, can be divided into information which does not change as the active subscriber crosses a cell boundary, and information which does change as the active subscriber crosses a cell boundary. Routing procedure associated with the information which does not change as the active subscriber crosses a cell boundary are established and may be stored in the memory of the switch, only once, at the beginning of the call, as in the circuit switch architecture. However, the routing procedures associated with the information which does changes as the active subscriber crosses a cell boundary may be derived from the header information of each packet that arrives at the appropriate portion of the switch. In this way the invention has the dynamic characteristics of a packet switch, thereby enabling the inventive architecture to adapt to very frequent crossings of cell boundaries by active subscribers, but at minimum increased burden to the switch. In an embodiment of the invention interface units derive routing information from packet address fields and control the flow of information without the intervention of a central controller. Specific embodiments may also involve storage of this information, as well, until the cell boundary is crossed.

An embodiment of the invention includes means for establishing an initial route for transmitting a number of packets of information between a first party and a second party. Each of the packets comprises a header which contains both information associated with a terminal of the first party, and information associated with a terminal of the second party.

As indicated above, the established route comprises at least two segments. One of the segments of the route has associated with it constant routing information which is stored in a memory portion of the system. This routing information remains constant during transmission of the packets, and the headers of the packets have portions associated with this constant routing information. These portions of the headers also remain constant during the transmission of the packets.

However, as also indicated above, a second segment of the route may vary during transmission of the packets. This segment therefore has associated with it varying routing information. The headers of the packets have portions associated with this varying routing information as well. These portions also may vary from one packet to another during transmission of the packets, corresponding to the varying routing information. Finally, the system has means for varying these latter portions of the header, in a manner representative of the second segment of the route.

Current cellular switches establish both the initial route, and the new routes required every time a cell boundary is crossed. However, in contradistinction to these current cellular switches, the inventive system may have two separate units, one of which establishes the initial route, and another one of which is used to vary only that portion of the header which changes as a cell boundary is crossed While the discussion has been in terms of cells and variations which occur as cell boundaries are crossed, it is clear that the invention may be applied to other applications which also require the varying of only a portion of the route during the transmission of a number of packets. Such applications may include, for example, the varying of a portion of the route in response to malfunctions.

As the public switched network evolves from a voice telephone network to a generalized information network, attention is increasingly focused on packet switching technologies, including pure packet switching and virtual circuit packet switching. This evolution of the public network, as well as the ability of packet switching to deal with the increasing burdens of an expanding cellular network, makes the application of packet-type switching, as in this invention, even more attractive to cellular technology.

DETAILED DESCRIPTION

Figure 1:
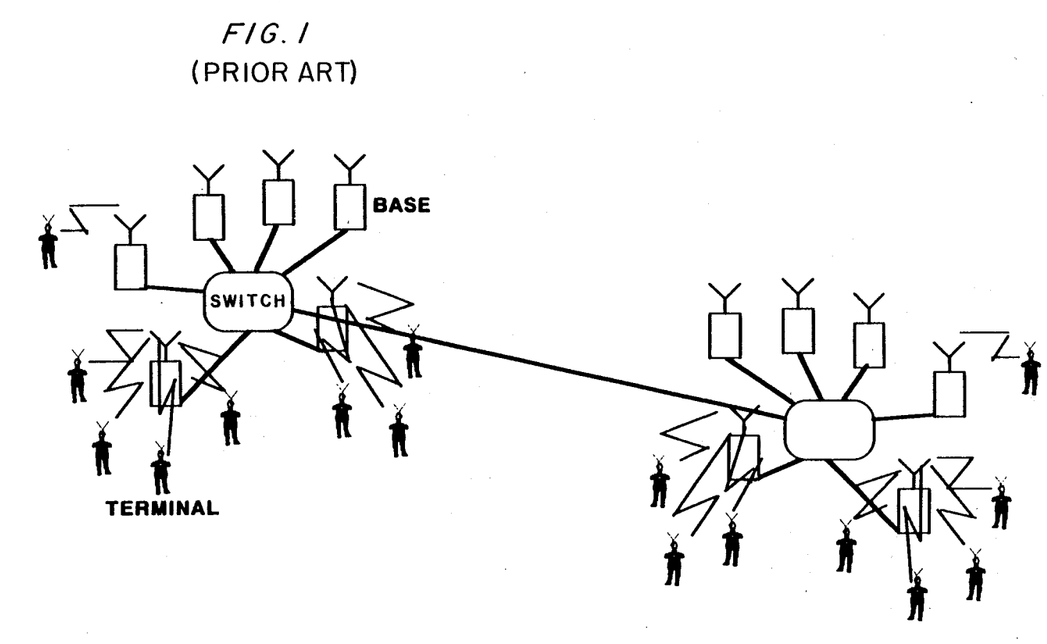
FIG. 1 is a schematic representation of a prior art cellular telecommunication system.

I. Introduction To A Specific Embodiment of the Invention Involving Cellular Telecommunications In order to provide wireless access to public networks, current cellular systems contain wireless terminals, base stations, and at least one cellular switch. As shown schematically in FIG. 1, the switch is connected to an ensemble of base stations. Each base station is in radio contact with many wireless terminals. The system infrastructure is the combination of hardware and software that links base stations with cellullar switches, and cellular switches with one another.

The complexity of a cellular system is due in large part to the mobility of the wireless terminals. Unlike fixed networks, cellular systems require frequent changes in configuration. To establish each call, the system has to learn the location of a wireless terminal; and, it must be able to adapt itself to one or more changes in terminal location during the call.

Many network control functions are unique to cellular networks. Some are not necessary in fixed networks, and others are performed differently in cellular and fixed networks. Examples include: authentication, location updating, paging, call set-up, call release, power control, and handover. In present cellular systems, these functions are primarily tasks of the cellular switches.

It is anticipated that future systems will serve a much higher population of users than present systems. As a consequence, cells will be considerably smaller than at present and the volume of network rearrangements, necessary each time the subscriber crosses a cell boundary, (location updating, power control, and handover) will grow by orders of magnitude. This volume will overwhelm the control capacity of present cellular switches.

To provide the necessary control, an embodiment of the invention, as applied to cellular switching systems, exploits packet communication technology to distribute network information among small processors (interface units) residing in all network elements. It uses the address field of each packet to provide routing information corresponding to the changing location of the wireless terminal.

Figure 2:
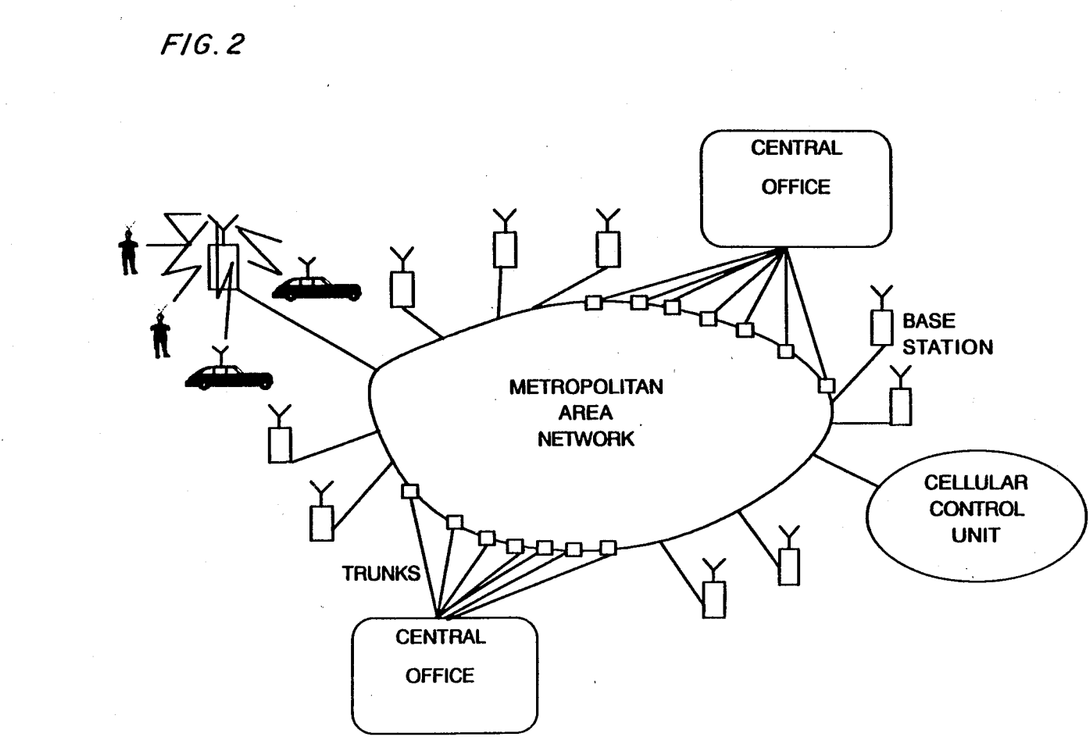
FIG. 2 is a schematic representation of an embodiment of the inventive telecommunication switching system involving cellular switching.

As indicated in FIG. 2, I view the infrastructure of the inventive cellular switching system as a wide area network (WAN) linking base stations, public switches, and a cellular control unit. Information may enter and leaves the WAN through cellular interface units including base station interface units (BIU); trunk interface units (TIU), each connected to a central office trunk of the public network; and a controller interface unit, CIU, connected to the cellular control unit.

The packet switching capability of a WAN works well with the Packet Reservation Multiple Access technique for information transfer between base stations and wireless terminals (D. J. Goodman, R. A. Valenzuela, K. T. Gayliard, and B. Ramamurthi, Packet Reservation Multiple Access for Local Wireless Communications, "Proc. 38th IEE Vehicular Technology Conference", Philadelphia June 1988, pp. 701–706). As a statistical multiplexer, PRMA offers an attractive combination of simple control, efficient bandwidth utilization, and robustness in the presence of wireless access channel impairments. To marry PRMA to the inventive cellular switching system, we may introduce to each terminal a wireless terminal interface unit (WIU).

II Interface Units

The WIU, BIU, TIU, and CIU of this embodiment organize information transfer among wireless terminals, base stations, central office trunks, and the cellular control unit, respectively. Each packet contains a source address and a destination address. Sometimes the address is the permanent identifier of an interface unit. At other times, the address is a call control number associated with a particular communication session. The addressing procedures are discussed in Section III in the context of specific communication and control functions. In this Section we describe the capabilities of the interface units.

II.a Cellular Trunk Interface Unit (TIU)

Figure 3:
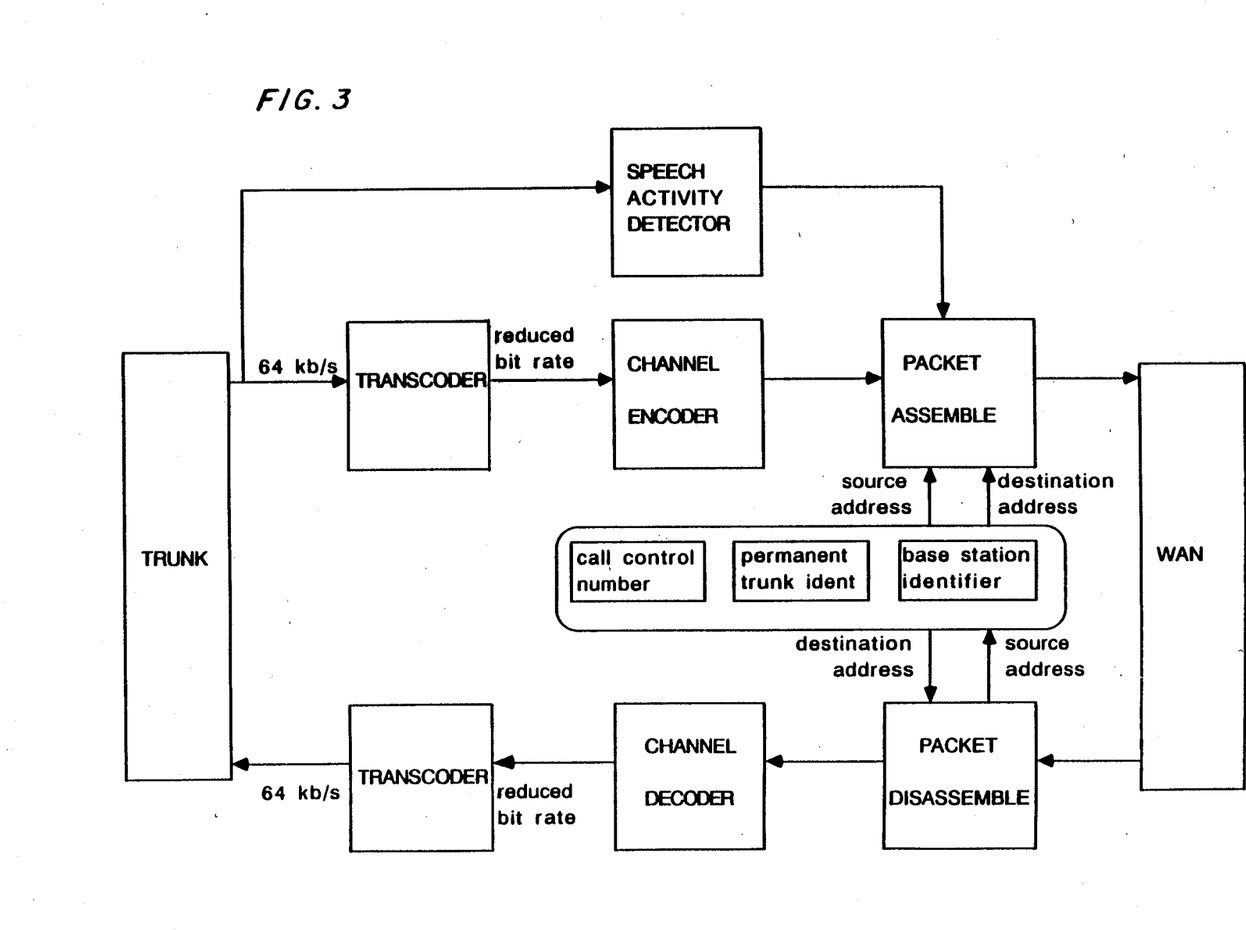
FIG. 3 is a schematic representation of an exemplary cellular trunk interface unit (TIU) which may be used in the inventive cellular switching system.

The TIU accepts and delivers information in the standard format of the public network. The speech format, for example, is 64 kb/s companded pulse code modulation. As indicated in FIG. 3, the TIU converts this information to and from the format of the wireless access physical layer by means of trandcoders and channel coders matched to the wireless access environment of the inventive cellular switching system. Each inventive cellular switching system can be customized for its own transmission environment (for example, urban mobile, indoor, or mobile satellite) by means of the transcoders and channel coders installed in the TIU's. An architecture that admits many terminal-base transmission technologies, each matched to a specific environment, may be important to the successful operation of future wireless access systems (E. S. K. Chien, D. J. Goodman, and J. E. Russell, Sr., Cellular Access Digital Network (CADN): Wireless Access to Networks of the Future, "IEEE Connunications Magazine", Vol. 25, No. 6, June 1987, pp. 22-31).

In addition to transforming user information between the formats of the fixed network and the wireless access channels, the TIU may contain a packet assembler and disassembler (PAD). Each PAD combines user information or network control information, with a packet header. The header may contain flags, an error control field, a packet control field and an address field. The address of the TIU can be the permanent trunk identifier, or it can be a call control number assigned by the cellular control unit. Packets sent from the TIU are routed to a base station by means of a portion of the address containing a permanent base station identifier. During a call this portion of the address changes to the permanent base station identifier of the new cell as the wireless terminal moves from the service area of one base station to another.

In FIG. 3, the packet disassembler reads the destination address of all packets arriving on the WAN. When this address matches either the permanent trunk identifier (during call set up), or the call control number (during a call), the packet disassembler processes the arriving packet. If the packet has arrived from a base station, the TIU records the source address of the packet in its base station identifier register. This identifier then becomes the destination address for packets launched into the WAN from the TIU.

II.b Wireless Terminal Interface Unit (WIU)

Figure 4:
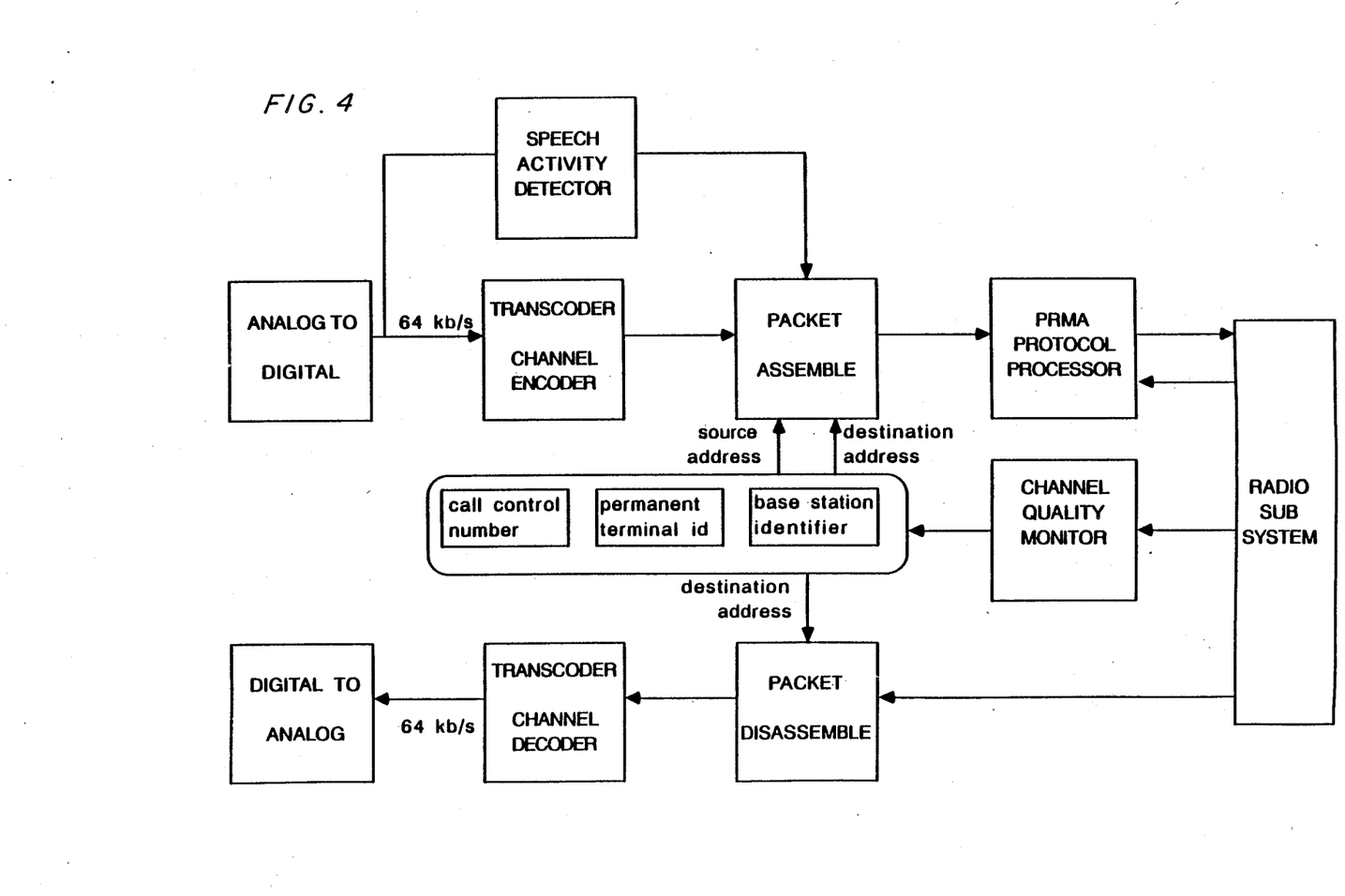
FIG. 4 is a schematic representation of an exemplary cellular wireless terminal interface unit (WIU) which may be used in the inventive cellular switching system.

In generating packets, the WIU is similar to the TIU. One difference is that the TIU receives user information from the public network, while the WIU generates its own user information, with, for example, a 64 kb/s analog-to-digital converter for speech signals. As indicated in FIG. 4, the packet assembler of the WIU delivers packets to the radio transmitter by way of an exemplary PRMA protocol processor.

As in the TIU, the packet disassembler compares the destination address of received packets with the either the permanent terminal identifier (during call set up), or the call control number (during a call). It extracts the information fields of speech packets destined for this terminal and converts them to a continuous 64 kb/s signal stream.

In order to implement terminal initiated handover, the WIU refers to a channel quality monitor to determine a base station identifier. This monitor indicates the identity of the base station best able to serve the terminal in its current location. This base station becomes the destination of packets sent from the wireless terminal.

II.c Base Station Interface Unit, BIU

This unit relays information between the TIU's and the wireless terminals. It also broadcasts, over its radio channel, the acknowledgement packets called for by the exemplary PRMA protocol (D. J. Goodman, R. A. Valenzuela,, K. T. Gayliard, and B. Ramamurthi, Packet Reservation Multiple Access for Local Wireless Communications, "Proc. 38th IEEE Vehicular Technology Conference", Phil., June 1988, pp. 701-708). The BIU multiplexes information packets that are sent to the radio transmitter. It also queues upstream packets for transmission over the WAN.

The BIU may always be addressed by its permanent identifier. If an incoming packet arrives with a call control number in its address field, this number becomes the destination address when the packet is relayed, either to a TIU (upstream packet), or to a WIU (downstream packet). Certain network control packets arrive without call control numbers. These packets are either relayed to the cellular control unit; or, they are relayed to a WIU by means of the permanent identifier of the WIU. This identifier is extracted from the information field of the control packet. Examples of these routing procedures appear in Section III.

II.d Cellular control unit interface, CIU

The cellular control unit receives, processes, and generates network control packets. It may always be addressed by its permanent identifier. It assigns a control number to each cellular call, and sends this number to the TIU selected for the call, and to the relevant WIU. To distribute the call control number to the TIU, the CIU may use the permanent identifier of the TIU. To send the call control number to the WIU, the CIU may place the base station identifier in the destination address field of a control packet, and the permanent terminal identifier in the information field of the control packet.

III. Network Control Examples

By referring to three examples: conversational speech, handover, and terminal initiated call set up, we show how the inventive cellular switching system organizes the flow of user information and system control information. The source and destination addresses of each packet control the routing of the packet to the correct interface unit. Prior to call set up, terminals and trunks are addressed by their permanent identifiers. In setting up a call, the cellular control unit assigns to the call a call control number. This number may then become the address of both the TIU and the WIU involved in the call. Base stations and the cellular control unit may always be addressed by their permanent identifiers.

III.a Terminal initiated call set-up

Figure 5:
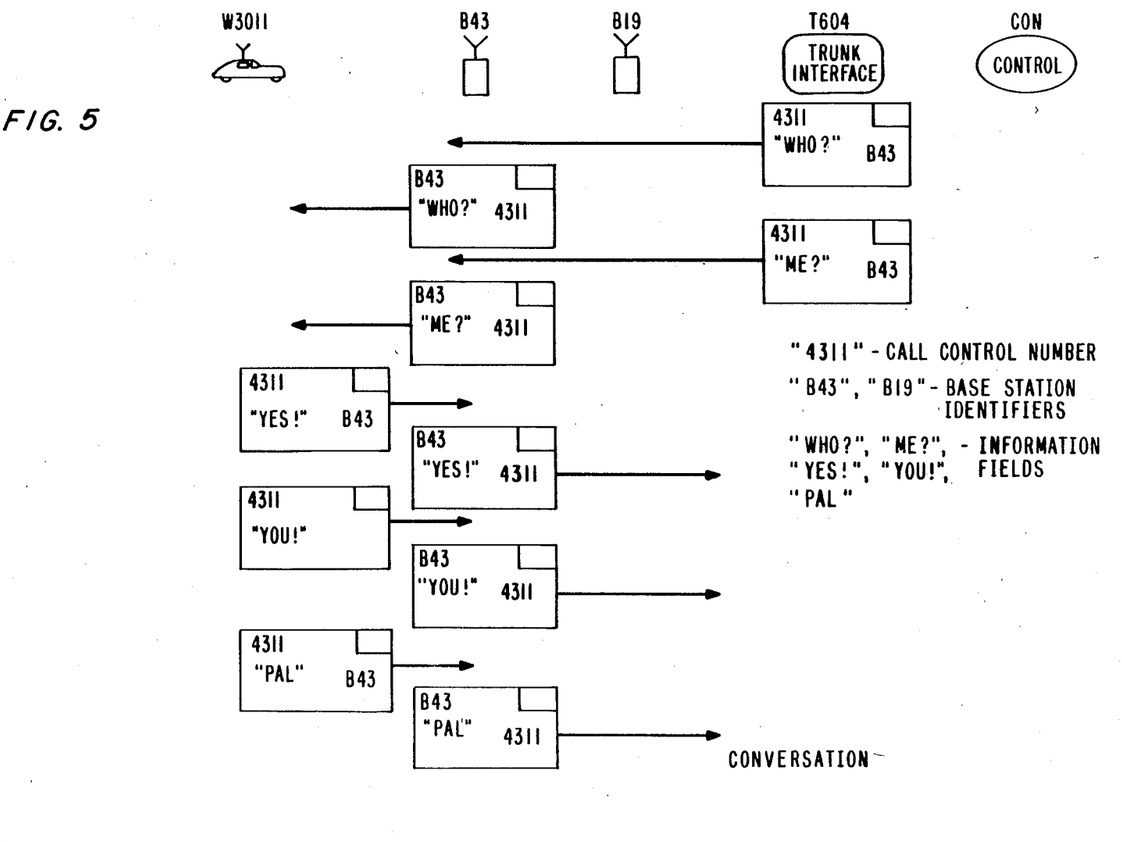
FIGS. 5 and 6 are schematic representations of a conversation using the inventive cellular switching system.
Figure 6:
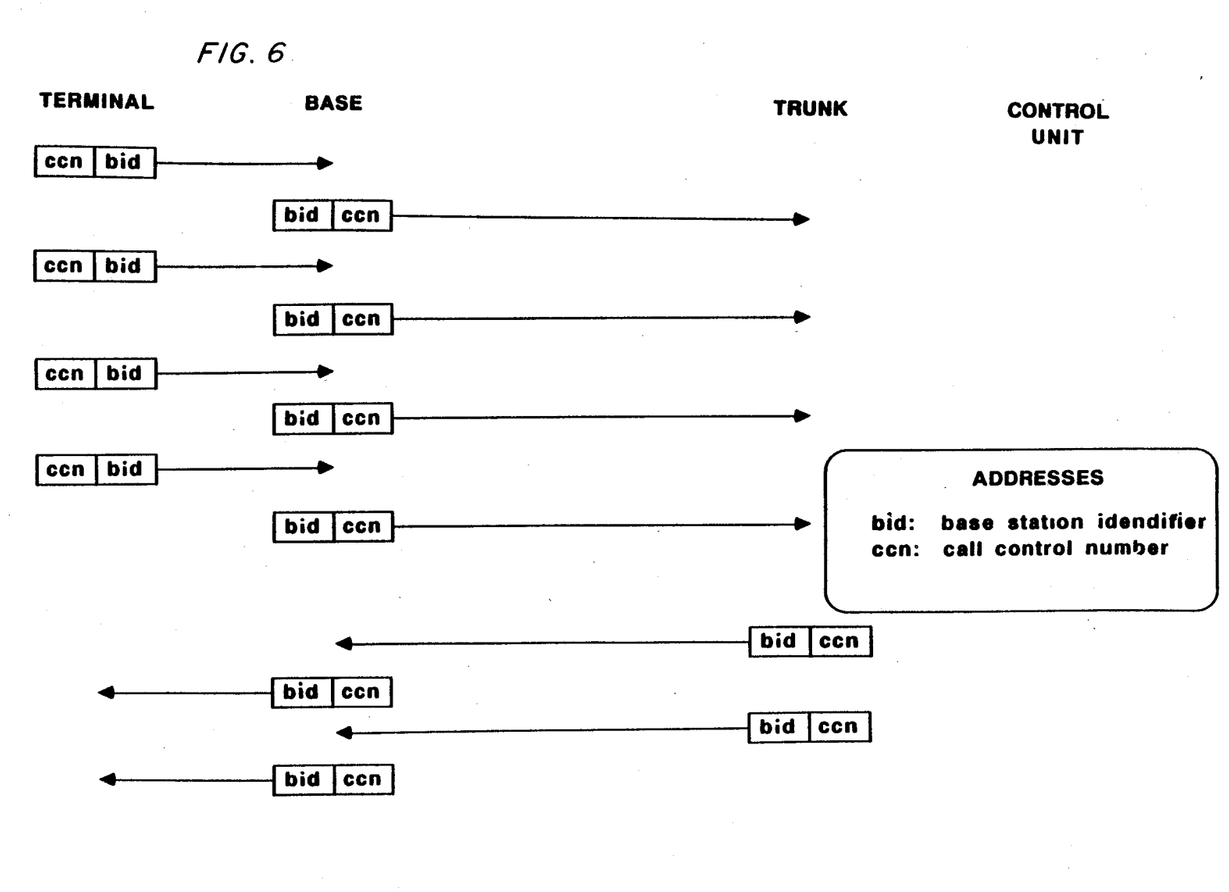
Figure 7:
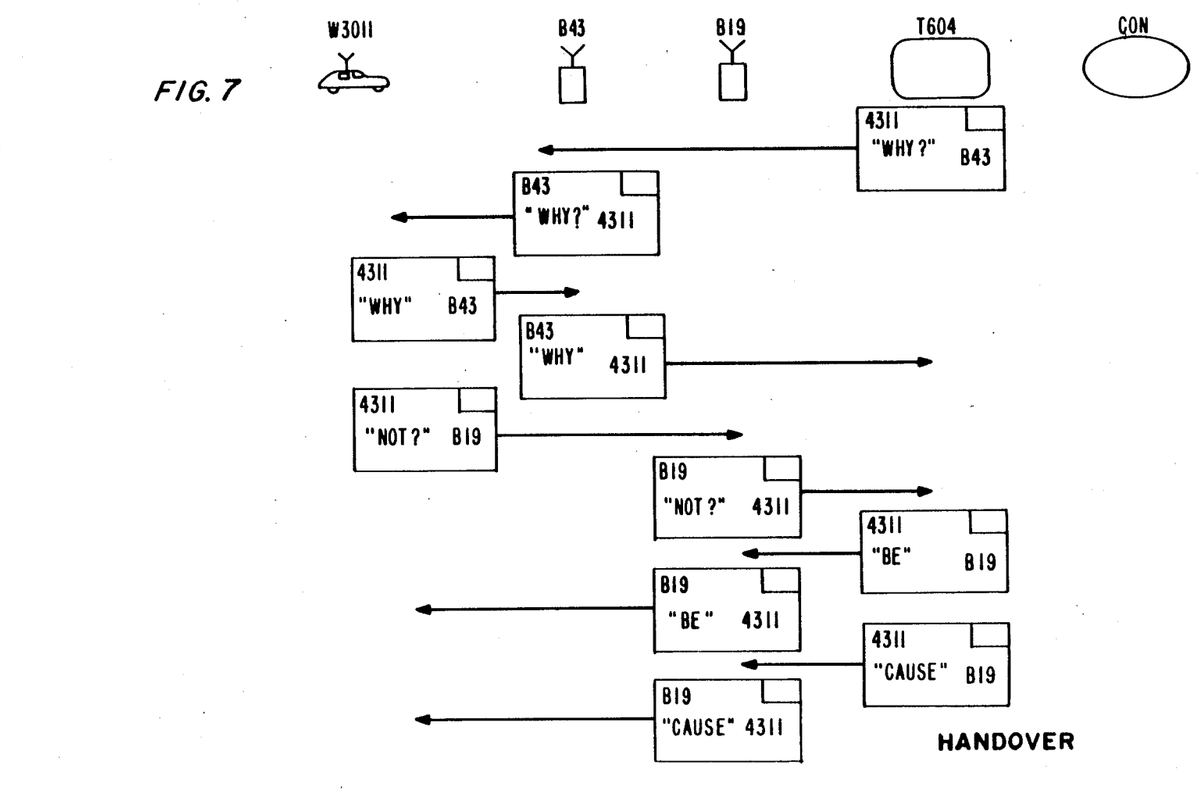
FIGS. 7 and 8 are schematic representations of a handover protocol using the inventive cellular switching system.
Figure 8:
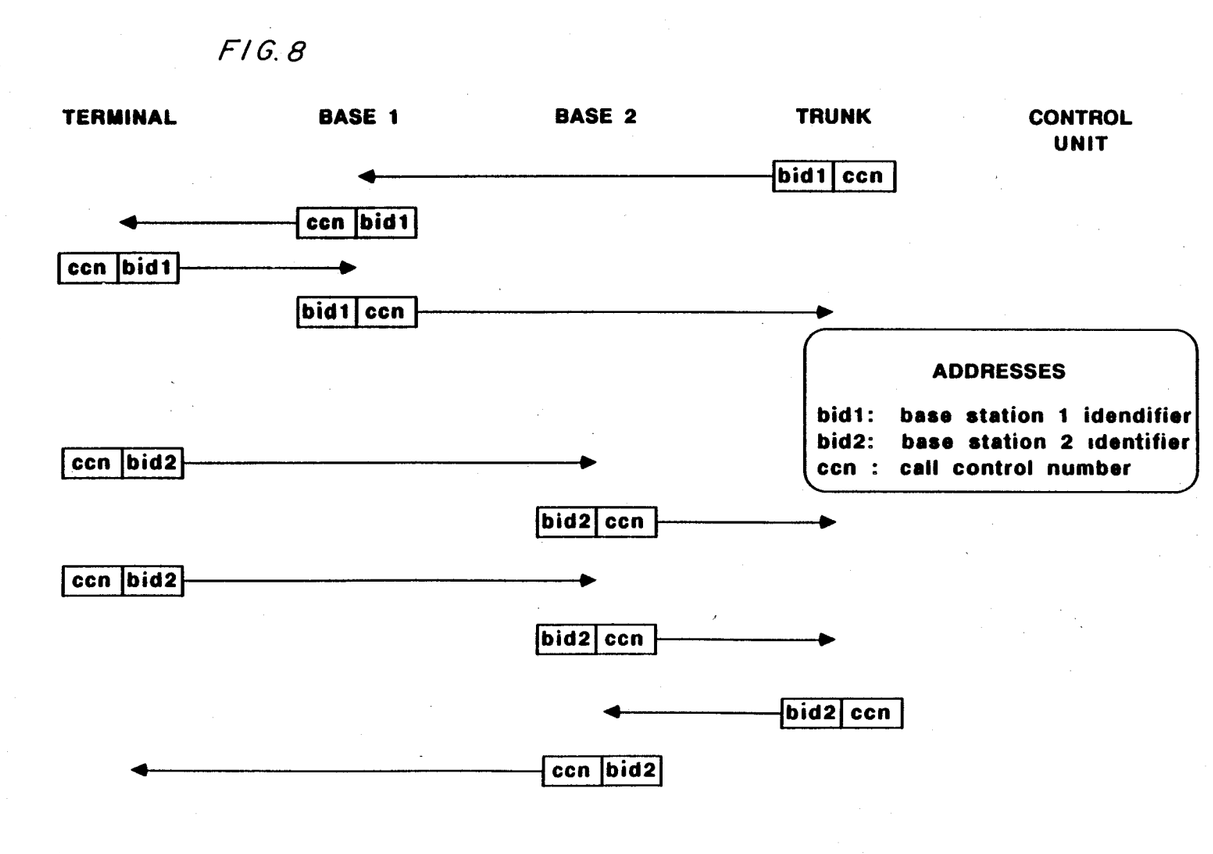
Figure 9:
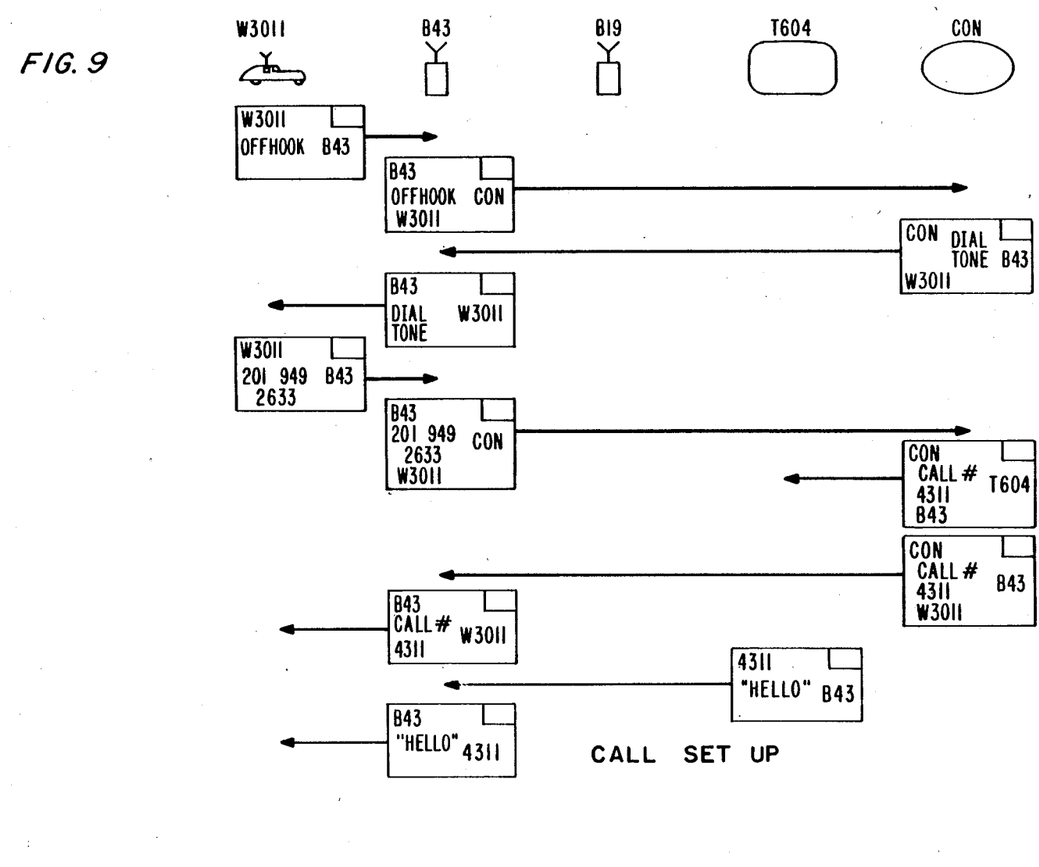
FIGS. 9 and 10 are schematic representations of a call setup sequence using the inventive cellular switching system.
Figure 10:
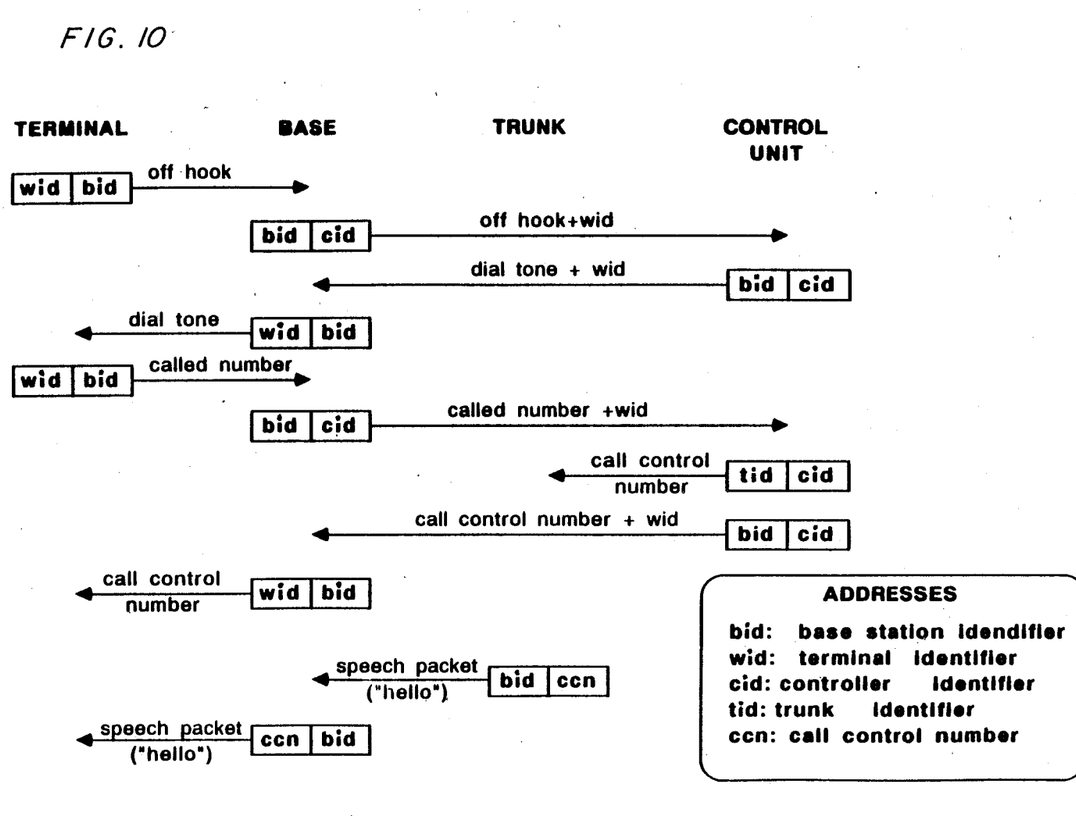

FIGS. 9 and 10 show one possible scenario for a call set up in the inventive cellular switching system. (In FIG. 9, as in FIGS. 5 and 7, each packet is represented by a illustrative "postcard" in which the destination address is shown in the center righthand portion of the "postcard", the return or "source" address is shown in the upper lefthand portion of the "postcard" and the "information field" is shown in the center lefthand portion of the postcard. In these Figures, the horizontal direction represents location, with each interface unit represented by a column on the page, and the vertical direction represents time. In FIGS. 6, 8 and 10, as in FIGS. 5, 7 and 9, the horizontal direction represents location and each interface unit is represented by a column on the page. The vertical direction represents time. The sequence of packet transfers is from top to bottom on the page. Each packet is indicated by a rectangle. The left side of the rectangle contains the source address of the packet. The right side contains the destination.)

In FIGS. 9 and 10 there is shown a sequence of control packets leading to the transmission of the first speech packet ("Hello") from the public network to the wireless terminal. In addition to the addresses of each packet, we also indicate, over the transmission arrow, the information content of the packet.

First the terminal sends an "off hook" message to the nearest base station. The base station relays the message, and the identity of the wireless terminal, to the cellular control unit. The controller uses the information in this message to authenticate the calling party. If the caller is authorized to place a call, the controller returns a "dial tone" message to the base station. The base station extracts the terminal identifier from the information field of the dial tone message and uses their identifier to relay dial tone to the WIU. The response to this message is a packet containing the called party's number. This enables the controller to attempt to establish a connection, through the local central office, to the called party.

When the connection is established, the controller issues a call control number to the WIU that initiated the call and to the TIU assigned to this call by the controller. With the call control number recorded in both the WIU and TIU, the conversation proceeds as in FIGS. 5 and 6. Handovers, as necessary, take place as shown in FIGS. 7 and 8.

III.b Conversation (no handover)

As long as the wireless terminal remains in a single cell, packets move from terminal to base station to central office trunk (and in the opposite direction) in a straightforward manner. FIGS. 5 and 6 illustrate such bidirectional flow of speech information. Generally a conversation consists of a sequence of talkspurts alternating in direction, with each talkspurt containing several packets. The average number is about 60, but there is a wide variability in the number of packets per talkspurt. Because the TIU and the WIU contain speech activity detectors, in this embodiment no packets need be generated in the silent gaps between talkspurts.

III.c Handover

The Inventive Cellular Switching System hands a call from one base station to another when the wireless terminal determines that the call can best be handled by the new base station. FIGS. 7 and 8 are schematic representations of a handover protocol. As indicated in FIGS. 6 and 7, the terminal initiates the handover by sending a packet to the new base station, "base 2", instead of "base 1", which received earlier packets. The speech packet is relayed to the central office trunk. There, the TIU learns the identity of the new base station and sends new packets to the terminal through base 2. If there has been no speech or other signals transmitted over an extended time period which includes the time that the subscriber crosses a cell boundary, then there is no way to determine that the call is best handled by a new base station. Accordingly an embodiment of the invention may include regular transmission, either periodic or random, of packets substantially free of information other than the header information. These packets may be used to determine that the call can best be handled by a new base station, despite the fact that there is an absence of other transmissions. Because the cellular control unit plays no role in the handover process, its work load is unaffected by the volume of handovers. This volume can be very high in a microcellular system.

IV. Network Topology Example

Figure 11:
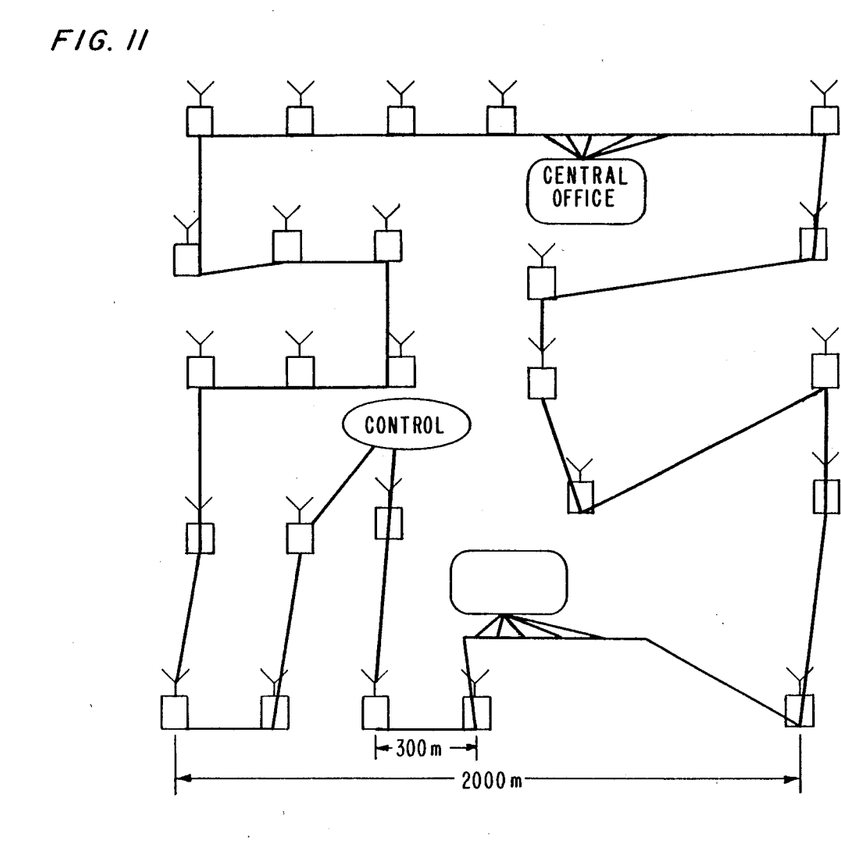
FIG. 11 is a schematic representation of a dual bus protocol embodiment of the inventive cellular switching system.

This section considers a dual bus protocol (J. F. Mollenauer, Standards for Metropolitan Area Networks, "IEEE Communications Magazine", Vol. 26, No. 4, April 1988, pp. 15–19; and R. M. Newman, Z. L. Budrikis, and J. L. Hullett, The QPSX Man, "IEEE Communications Magazine", Vol. 26, No. 4, April 1988, pp. 20–28) as one possible realization of the Wide Area Network in FIG. 2. Sometimes referred to as QPSX, this netw Standard 802.6. FIG. 11 shows a hypothetical arrangement of base stations and central office switches in a inventive cellular switching system service area of approximately four square kilometers. The service area contains two telephone switching offices and on the order of 50 base stations, placed approximately on a 300 meter grid. One cellular control unit serves the entire area. The dual bus topology is an open ring. In FIG. 11, the ring opening is located in the control unit.

For operation with a simplified version of the dual bus protocol, each PRMA packet can be designed to occupy exactly one slot on the dual bus. A nominal dual bus configuration operates at 150 Mb/s, with the bit stream organized in frames of duration 125 ms. With each frame containing 59 slots for user information, there are 38 bytes per slot. The PRMA protocol is also organized with slots and frames. If the total bit rate for speech information (source code plus channel code) is 16 kb/s, a PRMA packet of length 38 bytes, including 8 bytes of header information, implies a PRMA frame duration of 15 ms.

This means that during a talk spurt, a terminal or a trunk will generate one packet for every 120 (=15 ms/125 ms) dual bus frames. Therefore, the capacity of the dual bus is 59×120=7080 simultaneous conversations, assuming that, on average, a conversation produces one packet per PRMA frame. (This is a conservative. Measurements indicate that the long-term average is typically 0.72 to 0.86 packets per frame depending on the sensitivity of the speech activity detector).

Let us assume that the PRMA channel rate is 270 kb/s, and that the transmission bandwidth is 200 kHz. These are the bit rate and bandwidth of the Pan-European digital mobile radio system (J. Uddenfeldt and B. Persson, A. Narrowband TDMA System for a New Generation Cellular Radio, "Proc. 37th IEEE Vehicular Technology Conference", Tampa, June 1987, pp. 286–292. Then we find that each PRMA channel supports more than 20 simultaneous conversations. Allowing five PRMA channels (frequency multiplexed) per cell, we have each base station capable of carrying 100 simultaneous conversations. Thus, the fifty base stations in FIG. 8 have a capacity of 5000 simultaneous conversations, while the dual bus WAN can handle the equivalent of 7080 conversations. The extra WAN capacity will easily accommodate the required volume of network control packets.

The 100 conversations per cell is equivalent to approximately 85 erlangs of traffic with a blocking probability of 0.01. Each cell, therefore, supports 85 erlangs in a bandwidth of 1 MHz. If the cellular reuse factor is seven, the total system bandwidth is 7 MHz per direction, with 4250 erlangs carried in the 4 km2 service area of the inventive cellular switching system. The cellular efficiency is, therefore, 76 erlangs/km2/MHz, which is two orders of magnitude higher than the efficiency of present cellular systems.

I claim:

1. A telecommunications switching system comprising:
   means for establishing a route for transmitting a number of packets of information between a first party and a second party, each packet comprising a header which contains information associated with a terminal of the first party, and information associated with a terminal of the second party,
   the invention characterized in that
   the established route comprises at least two segments;
   the first segment of the route having associated with it constant routing information which is stored in a memory portion of the system, which routing information remains constant during transmission of the said number of packets, the headers of said number of packets having portions associated with said constant routing information, which header portions remains constant during the transmission of the said number of packets; and,
   the second segment of the route having associated with it varying routing information which may vary during transmission of the said number of packets, the headers of said number of packets having portions associated with said varying routing information, which header portions may vary from one packet to another during the transmission of the said number of the packets, corresponding to the varying routing information;
   the system further comprising means for varying the header information associated with the second segment of the route.

2. The system of claim 1 wherein the means for establishing the route are different from the means for varying that portion of the header which varies during transmission of the said number of packets.

3. The system of claim 2 wherein the varying routing information is varied in response to a variation in the geographical location of one of the parties.

4. The system of claim 3 further comprising means for stimulating the transmission of packets containing the said header portions despite the absence of other information portions.

* * * * *